UNITED STATES PATENT OFFICE.

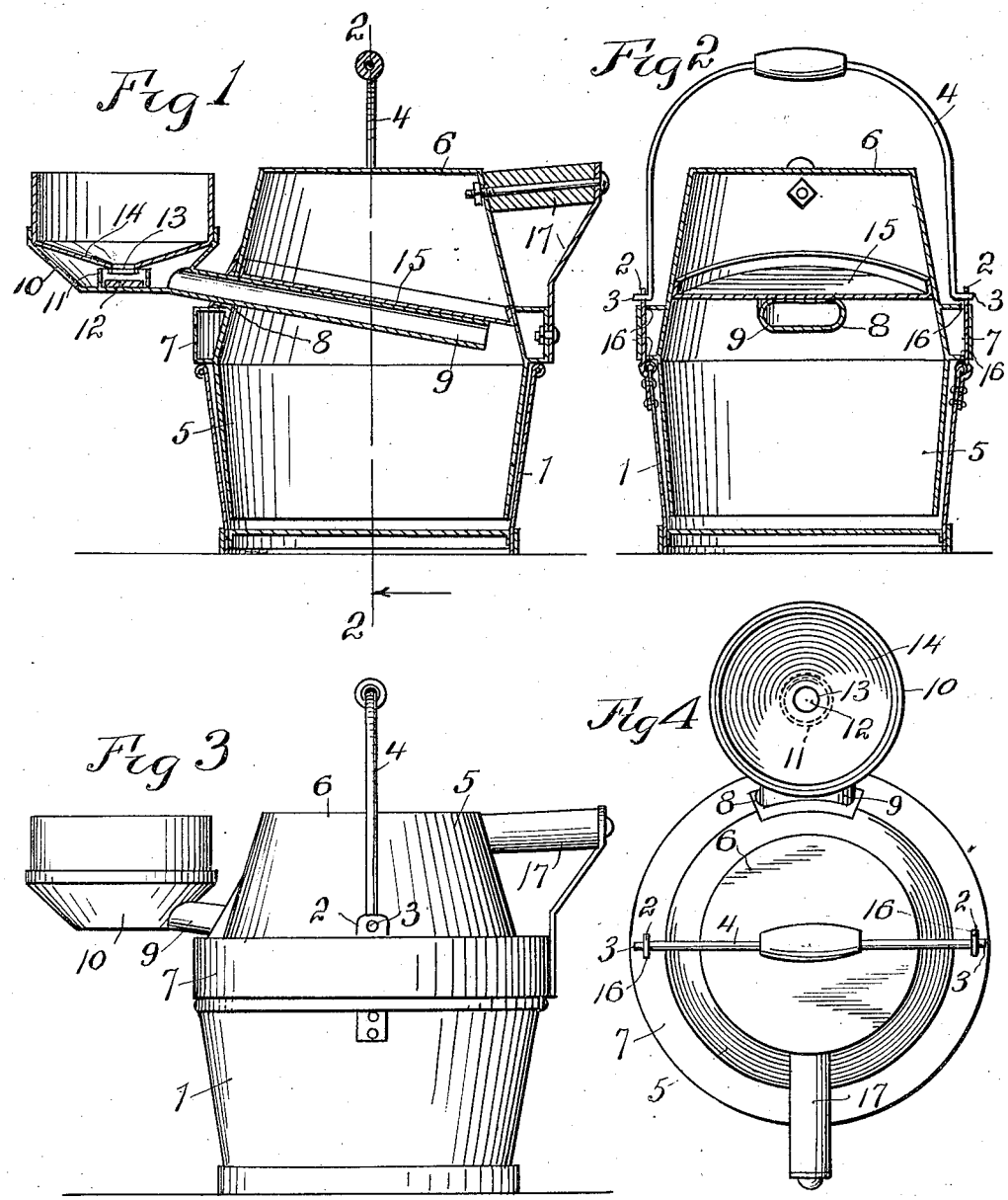

GEORGE L. ROLLINS, OF KANSAS CITY, MISSOURI.

COMBINED MILK PAIL AND STOOL.

1,426,508. Specification of Letters Patent. Patented Aug. 22, 1922.

Application filed August 9, 1920. Serial No. 402,402.

*To all whom it may concern:*

Be it known that I, GEORGE L. ROLLINS, a citizen of the United States, residing at Kansas City, in the county of Jackson and State of Missouri, have invented a certain new and useful Improvement in Combined Milk Pails and Stools, of which the following is a specification.

My invention relates to improvements in combined milk pails and stools.

The object of my invention is to provide a novel device of the kind described, which is simple in construction, cheap to make, durable, sanitary, and convenient in use.

The novel features of my invention are hereinafter fully described and claimed.

In the accompanying drawing, which illustrates the preferred embodiment of my invention, Fig. 1 is a vertical sectional view of my improved milk pail and stool.

Fig. 2 is a vertical sectional view on the line 2—2 of Fig. 1.

Fig. 3 is a side elevation of the same and Fig. 4 is a top view of the same.

Similar reference characters designate similar parts in the different views.

1 designates a milk pail of an ordinary type, provided at its upper end with two ears 2, adapted to respectively receive the outwardly turned ends 3 of a bail 4.

Removably mounted in the pail 1, is a stool having, preferably, the form of an inverted bucket 5, the upper end of which forms a seat 6, upon which the milker sits during the milking operation.

The middle portion of the stool 5 is provided with an annular peripheral tubular bearing portion 7, which is adapted to rest upon the upper edge of the milk pail 1.

The stool 5 above the annular portion 7, is provided with a lateral opening 8, which is otherwise than round, and which, as shown, is oblong, and in which is slidably fitted a discharge spout 9, the outer end of which is attached to one side of a milk receiving vessel 10, near the bottom thereof.

Centrally disposed upon the bottom of the vessel 10, is a cup 11, in which is mounted a check valve 12, which is preferably a float valve, which is adapted to be lifted by milk in the cup 11, so as to close a central opening 13, in a false bottom 14, with which the milk receiving vessel 10 is provided. The false bottom 14 preferably converges downwardly and extends into the cup 11.

The stool 5 is provided with a false bottom 15, which is in alinement with the upper side of the opening 8, and against the under side of which the discharge spout 9 is adapted to bear.

The annular portion 7 is provided with slots 16, through which the ears 2 are adapted to extend. The openings in the ears 2 are disposed above the annular portion 7, so that when the outwardly turned ends 3 of the bail 4 are operatively engaged with the ears, the bail releasably locks the stool 5, to the pail 1.

Attached to the stool 5 diametrically opposite the opening 8, is a handle, 17, preferably weighted, by which the stool, when detached from the pail 1, may be lifted and carried, and which serves to counter-balance the weight of the milk receiving vessel 10, when the device is carried by the bail 4.

In the operation of my invention, the parts are assembled as shown in the drawing. The milker sits on the seat 6 and milks into the receiving vessel 10, the latter being drawn outwardly to a position convenient for the purpose.

The milk after entering the vessel 10, passes through the opening 13, into the cup 11 which is filled and which discharges over its upper edge, the milk thus discharged, passing through the spout 9, into the stool 5, the lower end of which is open, and closely fitted to the interior of the pail 1.

In case that the device is overturned, it may be righted before much milk is spilled, the stool being locked to the pail during the milking operation.

When the milk fills the cup 11, the float valve 12 will lift and close the opening 13, as soon as the flow of milk through the opening 13 ceases, thereby preventing the access of insects or dirt through the opening 13, to the milk contained in the device.

After the milking operation, the vessel 10 and spout 9 may be withdrawn from the stool 5. The device may be then inverted and the milk discharged therefrom through the opening 8. The false bottom 15 serves the double function of reliably supporting the spout 9, and of guiding the milk to the opening 8, when the stool 5 and bail 1 are inverted.

To release the stool from the pail, the bail 4 is compressed and the ends 3 withdrawn from the ears 2, after which the stool may be lifted out of the pail 1.

By having the opening 8 other than circular, the spout 9 which is fitted thereto is held from revolving, thereby always retaining the vessel 10 in the upright position.

I do not limit my invention to the structure shown and described, as many modifications, within the scope of the appended claims, may be made without departing from the spirit of my invention.

What I claim is:—

1. In a device of the kind described, a pail having two ears, a stool comprising an inverted bucket mounted in and arranged to cover the pail and having two slots adapted to respectively receive therethrough said ears, and a bail engaging said ears and releasable from the ears and arranged to hold the ears from passing out of said slots, substantially as set forth.

2. In a device of the kind described, a stool comprising an inverted bucket adapted to be mounted in and serve as a cover for a milk pail and having a lateral opening and a false bottom alined with the upper side of said opening, and a milk receiving vessel having a spout slidably fitted in said opening and adapted to bear at its inner end against said false bottom, substantially as set forth.

3. In a device of the kind described, a stool adapted to serve as a cover for a milk pail and having a lateral opening and a false bottom which inclines to the upper side of said opening, and a milk receiving vessel having a spout slidably mounted in said opening and adapted to bear at its inner end on said false bottom, substantially as set forth.

4. In a device of the kind described, a stool adapted to serve as a cover for a milk pail and having a lateral opening other than circular, and having a false bottom alined with the upper side of said opening, and a milk receiving vessel having a spout slidably fitted in said opening, substantially as set forth.

5. In a device of the kind described, a stool adapted to serve as a cover for a milk pail and having a lateral opening other than circular, and having a false bottom alined with the upper side of said opening, and a milk receiving vessel having a spout slidably fitted in said opening and adapted to bear at its inner end against said false bottom, substantially as set forth.

6. In a device of the kind described, a milk receiving vessel having a discharge spout and a passage leading to said spout, and a check valve in said passage opening toward said spout, substantially as set forth.

7. In a device of the kind described, a milk receiving vessel having a discharge spout and a passage leading to said spout including a milk container, and a float valve in said container arranged to automatically close said passage, substantially as set forth.

8. In a device of the kind described, a milk receiving vessel having a discharge opening, a false bottom above said opening, and a milk container, the false bottom having an opening which discharges into said container, and a float valve in said container adapted to close said last named opening, substantially as set forth.

9. In a device of the kind described, a milk receiving vessel having a discharge spout, a false bottom above said spout having an opening, and a milk container arranged to receive milk from said opening, and a float valve in said container adapted to close said opening, substantially as set forth.

10. In a device of the kind described, a milk receiving vessel having a discharge spout, a false bottom having an opening, and a cup into which the opening discharges and over the upper edge of which the milk received from said opening discharges, the discharge spout being at the outer side of said cup, and a float valve in said cup adapted to lift and close said opening, substantially as set forth.

11. In a device of the kind described, a milk receiving vessel having at one side a lateral opening, and a weighted counterbalancing handle at the opposite side thereof, and a milk receiving vessel having a discharge spout mounted in said opening, substantially as set forth.

12. In a device of the kind described, a milk pail having a bail, a stool comprising an inverted bucket mounted in said pail and having at the side, above the pail, a lateral opening and having at the side opposite of said opening, a weighted counter-balancing handle, and a milk receiving vessel having a discharge spout mounted in said opening, substantially as set forth.

In testimony whereof I have signed my name to this specification.

GEORGE L. ROLLINS.